United States Patent [19]

Beyer et al.

[11] 3,995,485
[45] Dec. 7, 1976

[54] DRY, PORTABLE CALORIMETER FOR NONDESTRUCTIVE MEASUREMENT OF THE ACTIVITY OF NUCLEAR FUEL

[75] Inventors: Norman S. Beyer, Elmhurst; Robert N. Lewis, Clarendon Hills; Ronald B. Perry, Hinsdale, all of Ill.

[73] Assignee: The United States of America as represented by the United States Energy Research and Development Administration, Washington, D.C.

[22] Filed: Oct. 20, 1975

[21] Appl. No.: 624,194

[52] U.S. Cl. .......................................... 73/190 R
[51] Int. Cl.² .................................... G01K 17/00
[58] Field of Search ................. 73/190 R; 250/336

[56] References Cited

UNITED STATES PATENTS

| 2,911,824 | 11/1959 | Czerlinsky et al. | 73/190 |
| 3,267,728 | 8/1966 | Solomons | 73/190 |
| 3,718,437 | 2/1973 | Paloniemi | 73/190 |
| 3,869,914 | 3/1975 | Koehler | 73/190 |

OTHER PUBLICATIONS

Andersen "Polymerization Rates by Calorimetry" in Journal of polymer Sciences A-1 vol. 7, 1969 pp. 2888-2896.

Hiller et al. "Automatically Controlled Isothermal Adiabatic Calorimeter" in Review of Sci. Instruments, vol. 33 No. 9 3/62 pp. 323-330.

Boyd "An Isothermal Calorimeter for Solid State Reactions" in J. Sci. Instruments vol. 3 No. 6. 6/70 pp. 1-5.

Primary Examiner—Herbert Goldstein
Attorney, Agent, or Firm—Dean E. Carlson; Arthur A. Churm; Donald P. Reynolds

[57] ABSTRACT

The activity of a quantity of heat-producing nuclear fuel is measured rapidly, accurately and nondestructively by a portable dry calorimeter comprising a preheater, an array of temperature-controlled structures comprising a thermally guarded temperature-controlled oven, and a calculation and control unit. The difference between the amounts of electric power required to maintain the oven temperature with and without nuclear fuel in the oven is measured to determine the power produced by radioactive disintegration and hence the activity of the fuel. A portion of the electronic control system is designed to terminate a continuing sequence of measurements when the standard deviation of the variations of the amount of electric power required to maintain oven temperature is within a predetermined value.

5 Claims, 12 Drawing Figures

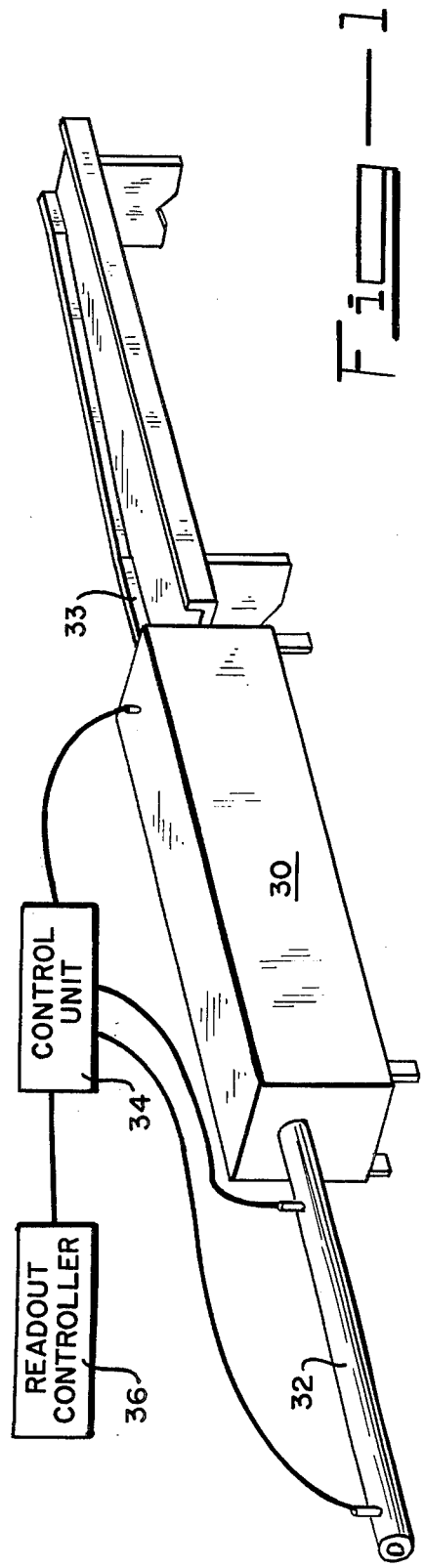
Fig—1
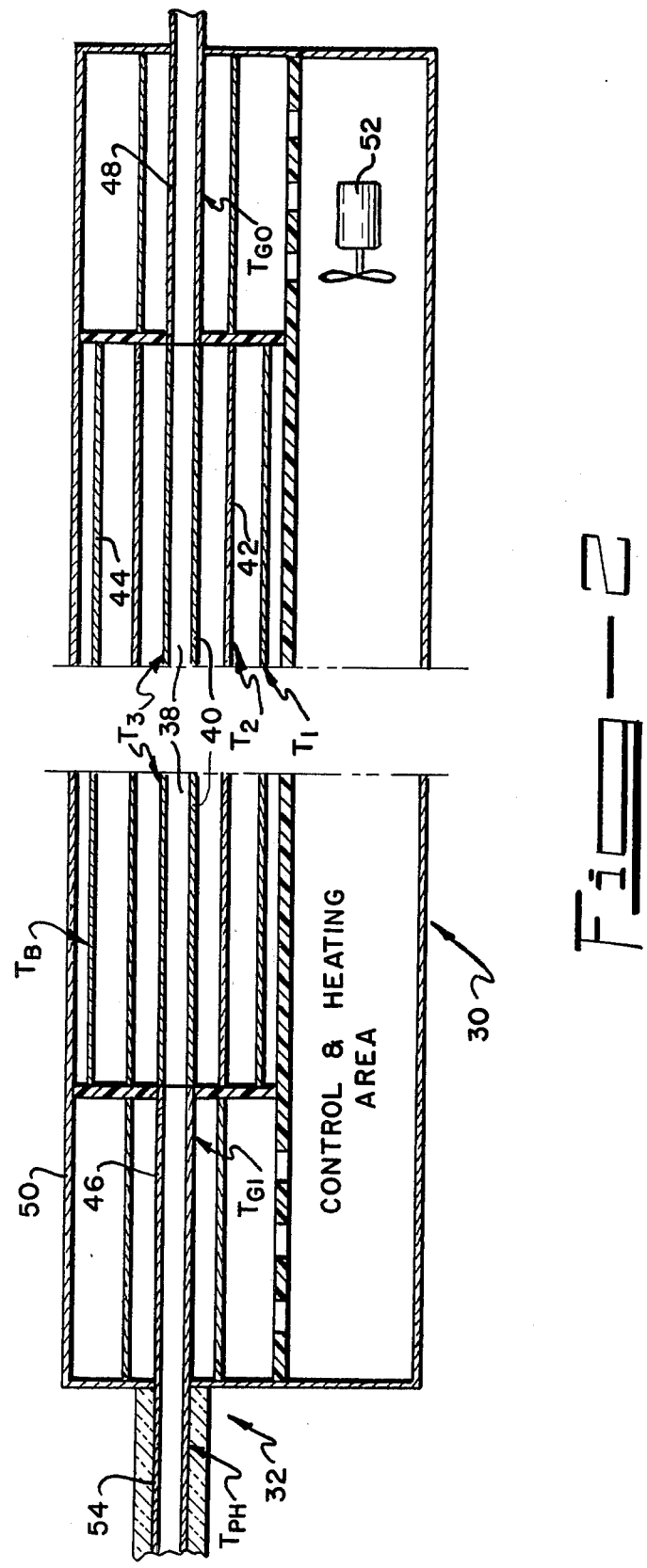
Fig—2

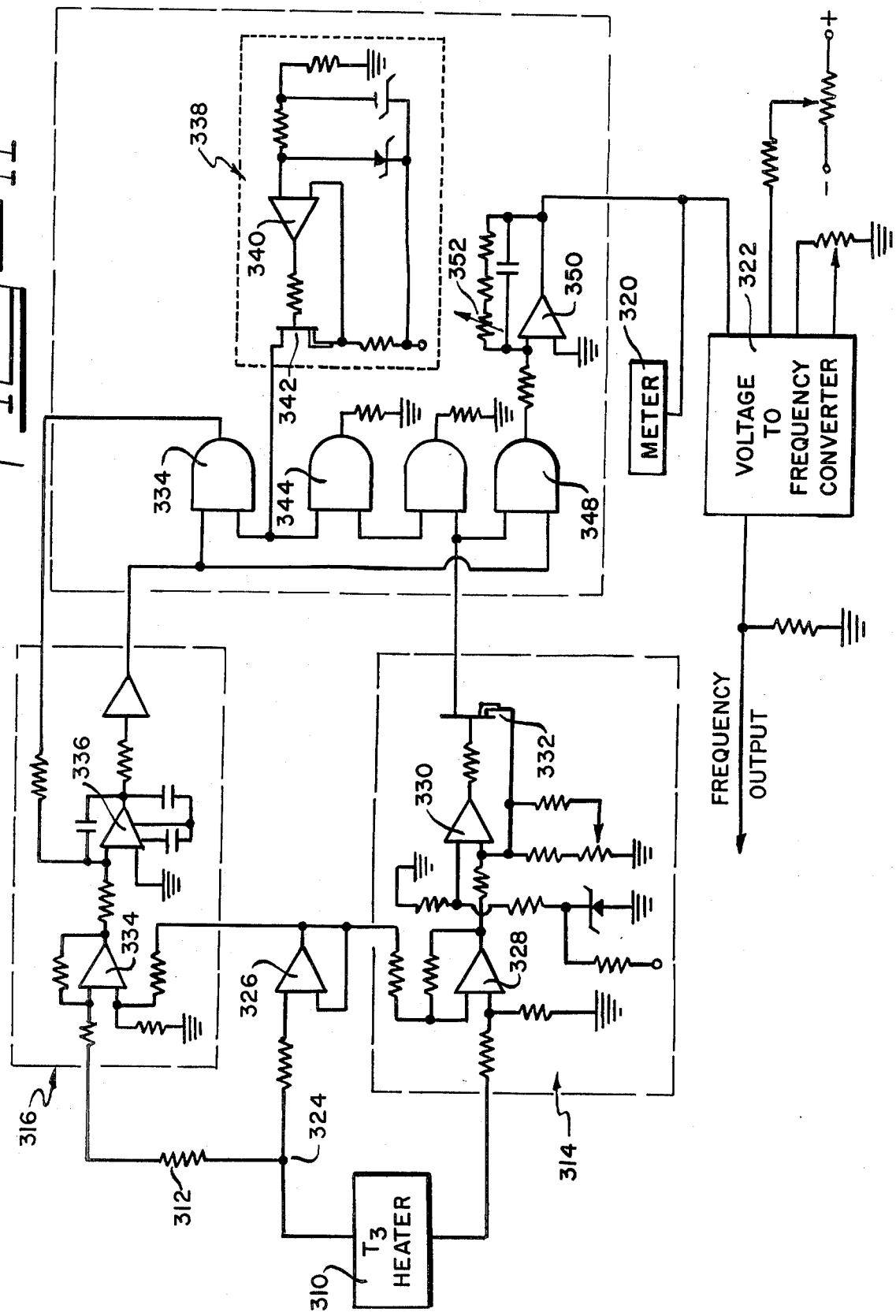

DRY, PORTABLE CALORIMETER FOR NONDESTRUCTIVE MEASUREMENT OF THE ACTIVITY OF NUCLEAR FUEL

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a better method and means of measuring the fuel content of a quantity of nuclear fuel containing plutonium or other heat-producing constituents.

A prime objective of the Nuclear Safeguards Program is the continual measured control of the inventory of fissionable materials, especially plutonium, that is in the form of fuel rods ready for insertion into nuclear reactors. In addition to the pressing concern for maintaining tight control of a plutonium inventory against possible theft, it is desirable for operating purposes to know that state of an inventory of fuel rods. Furthermore, it is desirable to be able to measure a given nuclear fuel rod to assure that the rod has been properly loaded with an appropriate number of fuel pellets of a desired activity. In addition, it may be desirable to measure a single pellet, and it may be desirable to measure quantities of fuel in other forms, such as plates or slurries. All these objectives can be achieved best by a method or means of measuring nondestructively the radioactivity of a quantity of fuel that is convenient to the places where the fuel is either manufactured or stored before use. It is also necessary that such measurements be made on schedules approximating a production basis in a reasonable length of time.

One method of assessing the activity of nuclear fuel comprises measuring the radiation emitted from this fuel in the form of alpha, beta, or gamma radiation or neutrons or a combination thereof. The spectra thus determined useful in determining the types of radioactive materials in the fuel and the intensities thus determined can be interpreted to give information about the quantities of materials on hand. However, this method does not provide sufficient accuracy to satisfy all the needs of a program of nuclear safeguards and it is sufficiently time-consuming to be of questionable value even for operating inventory control. The highest accuracy is achieved by a combination of chemical and mass-spectrometric analyses, but these are of necessity destructive tests. Calorimetric methods have been used to measure the heat emitted by nuclear fuel and to provide information on the quantities of radioactive material in combination with information obtained by spectrometric analysis or by previous chemical analysis as to the expected constituents in the fuel. However, calorimetric methods providing sufficient accuracy in measuring nuclear fuel rods or pellets for the nuclear safeguards program have heretofore involved the use of large liquid calorimeters in closely controlled laboratory measuring situations. These methods also have taken considerable lengths of time, periods of the order of hours for each fuel rod, which obviates their use for routine methods of inventory control on something approximating a production basis. It would be conceivable to transport a substantial inventory of fuel rods to a remote location for calormetric measurement, but such an exercise would be futile if the measurements took hours for each fuel rod.

It is an object of the present invention to provide a better method and means of analyzing nuclear fuel nondestructively.

It is a further object of the present invention to provide a fast, accurate, portable instrument for measuring the fuel content of nuclear fuel pellets.

It is a further object of the present invention to provide a fast, accurate, portable instrument for measuring the fuel content of nuclear fuel rods.

It is a further object of the present invention to provide a fast, portable dry calorimeter for nondestructive analysis of the quantities of radioactive materials present in samples of nuclear fuel.

Other objects will become apparent in the course of a detailed description of the invention.

SUMMARY OF THE INVENTION

The amount of radioactive material in a quantity of nuclear fuel is measured rapidly and accurately by a dry portable calorimeter including a preheater for heating the fuel to a temperature close to a measuring temperature and a temperature-guarded test chamber having controlled temperature gradients for measuring the amount of electric power necessary to maintain the temperature of the test chamber when the fuel is inserted therein. The change in electric power required to maintain a constant temperature in the test chamber upon insertion of nuclear fuel therein is equal to the amount of thermal power generated by radioactive materials in the fuel. An electronic circuit provides extreme accuracy in controlling the temperatures of the preheater and the various temperature-controlled components of the test chamber and also effects the repeated cycling of the measurements until a predetermined level of precision is attained.

BRIEF DESCRIPTION OF THE DRAWINGS

FIG. 1 is a sketch showing the functional arrangement of the components of the present invention.

FIG. 2 is a sectional diagram of the preheater and test chamber of FIG. 1 showing the various temperature-controlled regions.

FIG. 3. is a functional overall diagram of the calorimeter.

FIG. 11 is a circuit diagram of the E × I multiplier.

DETAILED DESCRIPTION OF THE INVENTION

Figure 5:
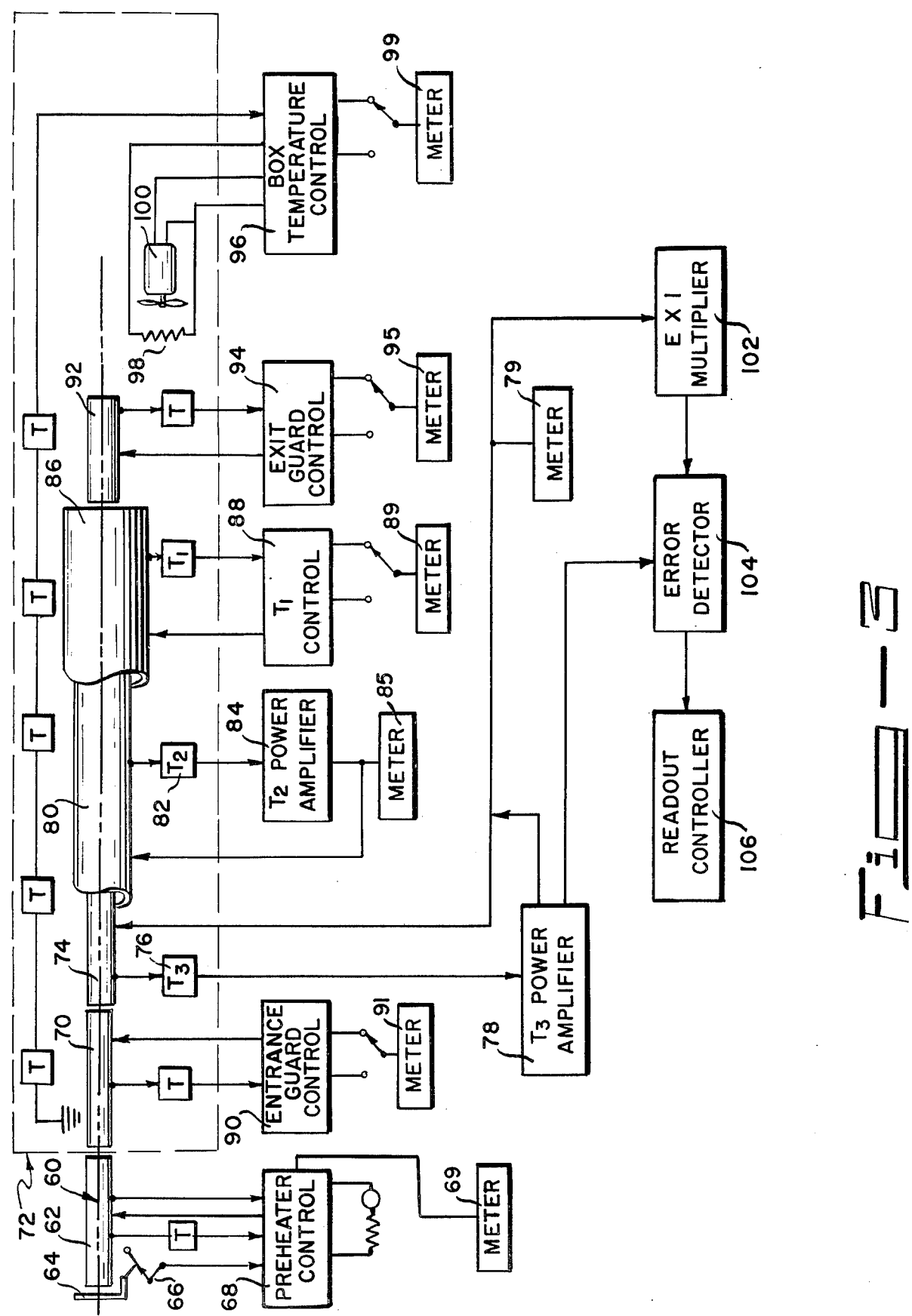
FIG. 5 is a block diagram of the $T_3$ and $T_2$ temperature-sense circuits.

FIG. 1 is an overall sketch showing the components of the present invention. In FIG. 1, box 30 contains means for holding, heating and measuring the equivalent electric power of a quantity of nuclear fuel. Preheater 32 is in line with box 30 and it attached thereto for the purpose of bringing the nuclear fuel approximately to measurement temperature before the fuel is inserted into box 30. This minimizes the amount of time necessary to achieve thermal stability for measurement. Table 33 supports the fuel during and after its removal from box 30. Both box 30 and preheater 32 are connected to electronic control unit 34 which supplies heating power to the various heaters in box 30 and preheater 32. Operator control of the calorimeter is achieved at readout controller 36 which receives and processes information from a human operator and receives, processes, and displays information received from control unit 34. Preheater 32 is designed for quick physical and electrical disconnection from box 30 and table 33, and control unit 34 and readout controller 36 are similarly capable of quick electrical disconnection to facilitate movement of the calorimeter to a measuring location. This is in contrast to the typical wet calorimeter which, in sizes appropriate to measure the activity of most nuclear fuel rods, is distinctly not portable.

Understanding of the description of the calorimeter will be facilitated by reference to FIG. 2, which is a sectional diagram showing the temperature regions that are controlled in the practice of the present invention. In FIG. 2, region 38 is sized and shaped to fit the dimensions of a nuclear fuel element. For the purpose of this disclosure, the term "element" is defined to be a fuel slug, pellet, fuel plate, fuel rod, fuel pin, cluster, dispersion, fuel subassembly, fuel assembly, fuel slurry, fuel solution, or container of gas, all radioactive and all producing heat as a result of radioactive disintegration. The preferred embodiment that is described below was designed to measure a particular cylindrical fuel rod that was approximately 3 meters long and 6 mm in diameter. This fuel rod had an active portion containing fuel pellets that was approximately 1 meter long, located toward one end of the fuel rod. One skilled in the art could readily modify region 38 to fit a fuel element of any shape or dimension.

Region 38 is controlled by sleeve 40 to a temperature that will henceforth be referred to as $T_3$. Enclosure 42 includes sleeve 40 and region 38 and is maintained at a temperature $T_2$ to serve as a buffer to region 38. Enclosure 42, in turn, is in an enclosure 44 which is maintained at a temperature $T_1$ and serves as a buffer to enclosure 42. Heat loss from the element is minimized by an inlet guard 46 and an outlet guard 48 which are maintained, respectively, at temperatures $T_{GI}$ and $T_{GO}$. All the foregoing components are contained within a box 50 which is maintained at temperature $T_B$ in the region surrounding enclosure 44. A fan 52 circulates air within box 50 to help equalize the temperature therein. Preheater 54 is situated physically in line with region 38 and enclosures 42 and 44 and is controlled at a temperature $T_{PH}$. All the seven temperatures just listed are controlled to temperatures that are a few degrees above ambient temperature. The precision of control, however, varies considerably among the different temperatures, with $T_3$ and $T_2$ controlled to the highest precision. Temperatures $T_3$ and $T_2$ are also controlled to maintain a constant gradient between them, with $T_3$ slightly greater than $T_2$, which in turn is greater than $T_1$. $T_{GO}$ and $T_{GI}$ are controlled at the value of $T_3$, and $T_B$ is lower than the rest.

Operation of the apparatus of FIG. 2 is as follows. A nuclear fuel element is inserted in preheater 54 where it is brought approximately to the measuring temperature. The nuclear fuel element is then moved from preheater 54 into box 50 in such a way that the active portion of the fuel rod, the part containing nuclear fuel, is in region 38. Before region 38 was occupied by a portion of the nuclear fuel element, a certain amount of electric power was required to maintain the temperature of region 38. When a fuel element is inserted so that its active portion is in region 38, the heat generataed by the fuel reduces the amount of external electric power that must be supplied to keep region 38 at the same temperature. The difference in electric power required is the power supplied by the nuclear fuel. Measurement of this difference thus provides measurement of the heat production of the fuel element. This, in turn, can be interpreted to compute the quantity of the heat-producing radioactive isotopes in the fuel, provided information is available as to the isotopic composition of the fuel. A mass spectrometer typically provides sufficient information to identify the isotopes of plutonium and daughter products and their relative percentages in a given element. Alternatively, the percentages of various isotopes that are present may be made available as a result of the known chemical analyses of the batch represented in a particular fuel element, corrected by well-known techniques for radioactive decay since the analysis was performed. The process applied for calculation is the following. The total heat produced by an element, which is measured by the calorimeter of the present invention, is the sum of the quantities of heat produced by each isotope contained in the element. The amount of heat produced by each plutonium isotope is the product of the mass of the particular isotope and the specific power for that isotope. The specific power is a constant for a particular isotope that states the power generated per unit mass of that isotope, expressed in watts per gram or equivalent converted unit. The isotopes of interest include Pu-238, Pu-239, Pu-240, Pu-241, Pu-242, and Am-241. The weight percent of Am-241 in a given fuel element is usually determined for the appropriate batch by chemical separation and gamma-pulse analysis. Thus, for a particular fuel element, the information that is normally available from analysis or obtainable by mass spectrometry and gamma pulse analysis is the mass of the fuel mixture, the mass percent of each plutonium istope, the mass percent that is Am-241, and the specific power for each of the above components. The power produced by radioactive disintegration is the sum of the products of the mass of each isotope, calculable from the informtaion noted above, times the specific power for that isotope. The sum of these products is equal to the power produced by radioactive disintegration and is also equal to the power measured by the calorimeter. The result is an equation in which everything is known except the mass of plutonium. It follows that the mass of plutonium can be calculated by solving the equation.

The steps described above are performed as follows for a mixed-oxide fuel element (i.e. a mixture of plutonium oxide and uranium oxide) containing the various isotopes of plutonium and the isotope Am-241 which is a daughter product.

Known: Total heat produced by an element = sum of the quantities of heat produced by the plutonium isotopes in a rod and the Am-241 isotope therein or W = Watts produced by the fuel element as measured calorimetrically = SUM [(watts from Pu-238) + (watts from Pu-239) + (watts from Pu-240) + (watts from Pu-241) + (watts from Pu-242) + (watts from Am-241)].
This sum omits quantities of uranium, which produce negligible amounts of heat in fuel elements containing plutonium. Also known:

$I_i$ = the isotopic ratio (i.e. weight percent) of the $i^{th}$ isotope;
$P_i$ = the specific power of the $i^{th}$ isotope (i.e. watt/gram).

Let:

M = the total mass of all the isotopes.

Using W, $I_i$, $P_i$ and M, the following relationsips are derived:

Mass of an individual isotope = $I_i$ = M
Watts produced by an individual isotope = $P_i$ ($I_i$ × M)

Therefore, by substitution the original relationship becomes:

W = Total watts measured/fuel element = Sum [$P_{238pu}$ $I_{238pu}$ M + $P_{239pu}$ $I_{239pu}$ M + . . . + $P_{241am}$ $I_{241am}$ M].

Since all factors except M are known, the equation can be solved for M. Similar calculations follow for quantities of nuclear fuel containing different heat-producing isotopes.

Further understanding of the invention may be had from FIG. 3 which is a functional block diagram of the apparatus of the present invention. In FIG. 3, broken line 60 indicates the progression of a nuclear fuel element from preheating through measuring and exit. In the preferred embodiment, the element was a fuel rod. A fuel rod first enters preheater 62 through door 64 which is connected to microswitch 66. When door 64 is open, microswitch 66 causes preheater control 68 to cut the power to preheater 62. This prevents uneven heating of a fuel rod on insertion into preheater 62 or removal from preheater 62. The function of preheater control 68 is to apply a necessary amount of electric power to preheater 62 to control the temperature of the preheater and a fuel rod therein to a predetermined value. Meter 69 is connected to preheater 68 to display the error signal controlling preheater 68. When the fuel rod has achieved the predetermined value, it is pushed into box 72 through entrance guard 70. A convenient method of operation is to insert a second fuel rod into the preheater 62, thus pushing the first fuel rod. As discussed above, microswitch 66 modified the action of preheater control 68 to prevent an overreaction of the preheater to the insertion of a cold fuel rod from outside which would have the corresponding disadvanatage of overheating a departing rod that was being inserted from the preheater into the box.

The preheated fuel rod that has been inserted into box 72 is disposed so that the active portion of the rod, the part containing fuel pellets, is centered within cylinder 74. This is a metal sleeve slightly larger in diameter than the fuel rod and containing heating and sensing elements. The sensing element is connected to $T_3$ thermometer 76 which responds electroncially to the temperature of first cylinder 74 and controls the response $T_3$ power amplifier 78 which, in turn, is connected to first cylinder 74 to maintain the desired temperature. Meter 79 provides a visual indication of the error signal. First cylinder 74 is enclosed, except at its ends, in second cylinder 80, which also includes temperature-sensing and heating elements. A signal corresponding to the temperature of second cylinder 80 is coupled to $T_2$ thermometer 82 which controls $T_2$ power amplifier 84, which, in turn, controls the amount of electrical energy applied to heat second cylinder 80. Meter 85 displays the feedback error signal. Second cylinder 80 is, in turn, enclosed, except at its ends, by third cylinder 86 which is maintained at temperature $T_1$ by $T_1$ controller 88. Meter 89 can be switched to indicate either the voltage applied to heat third cylinder 86 or the error signal. The temperature of entrance guard 70 is measured and controlled at temperature $T_{GI}$ by entrance guard control 90. Meter 91 is switched to indicate either applied voltage or error. Exit guard 92 is situated at the exit from third cylinder 86 and is subject to temperature control at temperature $T_{GO}$ from exit guard controller 94. Meter 95 is switched to indicate either applied voltage or error. Box 72, which encloses entrance guard 70, exit guard 92 and cylinder 74, 80 and 86, is subjected to box temperature control 96 to detect and maintain the temperature therein at temperature $T_B$. Box temperature control 96 applies a controlled amount of power to resistive heating element 98 which is disposed in front of fan 100 for circulation of air throughout box 72. Meter 99 is connected to box temperature control 96 to indicate either heater voltage or error. The dimensions of the elements contained within box 72 are set with particular fuel rods in mind. It will generally be desirable to make preheater 62 include an entire fuel rod so that there are no cold spots on a fuel rod upon its insertion into the box. The length of first cylinder 74, however, is made only slightly greater than the length of the active region in a fuel rod. A measurement will typically see a fuel rod having a portion protruding into entrance guard 70 and a portion protruding into exit guard 92 and, depending upon the position of the active region within the fuel rod, possibly beyond either or both of the guards 70 and 92. Control of the temperature of entrance guard 70 and exit guard 92 to the temperature of first cylinder 74 assures that there is no heat flow along line 60 from inside first cylinder 74 to interfere with the thermal stabilization of that portion of a fuel rod that is within first cylinder 74.

The critical temperatures of the calorimeter of the present invention, and the ones that the guards and enclosures of FIG. 3 are designed to protect, are the temperatures $T_3$ and $T_2$. This implies control of the temperature difference between $T_3$ and $T_2$, which controls heat flow between first cylinder 74 and second cylinder 80. It has proved possible to control these temperatures with a precision of 20 microK. To achieve such control of $T_3$, despite its exposure to fuel rod insertion, and to make a power measurement that is appropriate to such precise control, two outputs are taken from $T_3$ power amplifier 78. One output goes to the E × I multiplier 102 and the other goes to the error detector 104. E × I multiplier 102 is a digital circuit that repeatedly calculates the time-averaged product of the voltage (E) and current (I) to give a frequently sampled measure of the average power being delivered to cylinder 74 to maintain a constant temperature therein. Error detector 104 receives a signal from $T_3$ power amplifier 78 and also from E × I multiplier 102 and supplies therefrom various amounts of processed signals to readout controller 106. The general operation of these circuits is as follows. The calorimeter is allowed to achieve stability with a dummy rod containing no nuclear fuel in first cylinder 74 and a fuel rod preheating in preheater 62. The dummy rod is not necessary, but tends to keep the same patterns of air flow and heat flow as an active fuel rod. Achieving the control temperature $T_3$ in cylinder 74 takes a certain amount of power from $T_3$ amplifier 78, depending upon ambient temperature, air circulation, and the value of the control temperature $T_3$. When the preheated fuel rod is inserted with its active portion in first cylinder 74, the amount of power that must be delivered by $T_3$ power amplifier 78 to maintain the temperature $T_3$ in first cylinder 74 is different because the active portion of the fuel rod supplies power. Achieving stability at the different level of delivered power takes time. During that time, the error signal received by error detector 104 is changing and the amount of power delivered by $T_3$ power amplifier 78 to first cylinder 74 is changing. Readout controller 106 and error detector 104 repeatedly sample the output of E × I multiplier 102 and $T_3$ power amplifier 78. When a fuel rod is inserted in first cylinder 74, the readings will vary on their way toward a final value. As that final value is approached, there will be random variations about it, with the readings exhibiting a sampling error as the final value is approached more and more closely. Readout controller 106 is programmable to accept specification of an allowable standard deviation of the mean values of readings of the variation of the output of E × I multiplier 102 and to continue the sampling as long as the calorimeter has not achieved its final value within the allowable value of standard deviation of the mean. This method of control allows the precision of the calorimeter reading to be predetermined and further allows measurements to that predetermined precision to be made in the minimum amount of time necessary.

Figure 4:
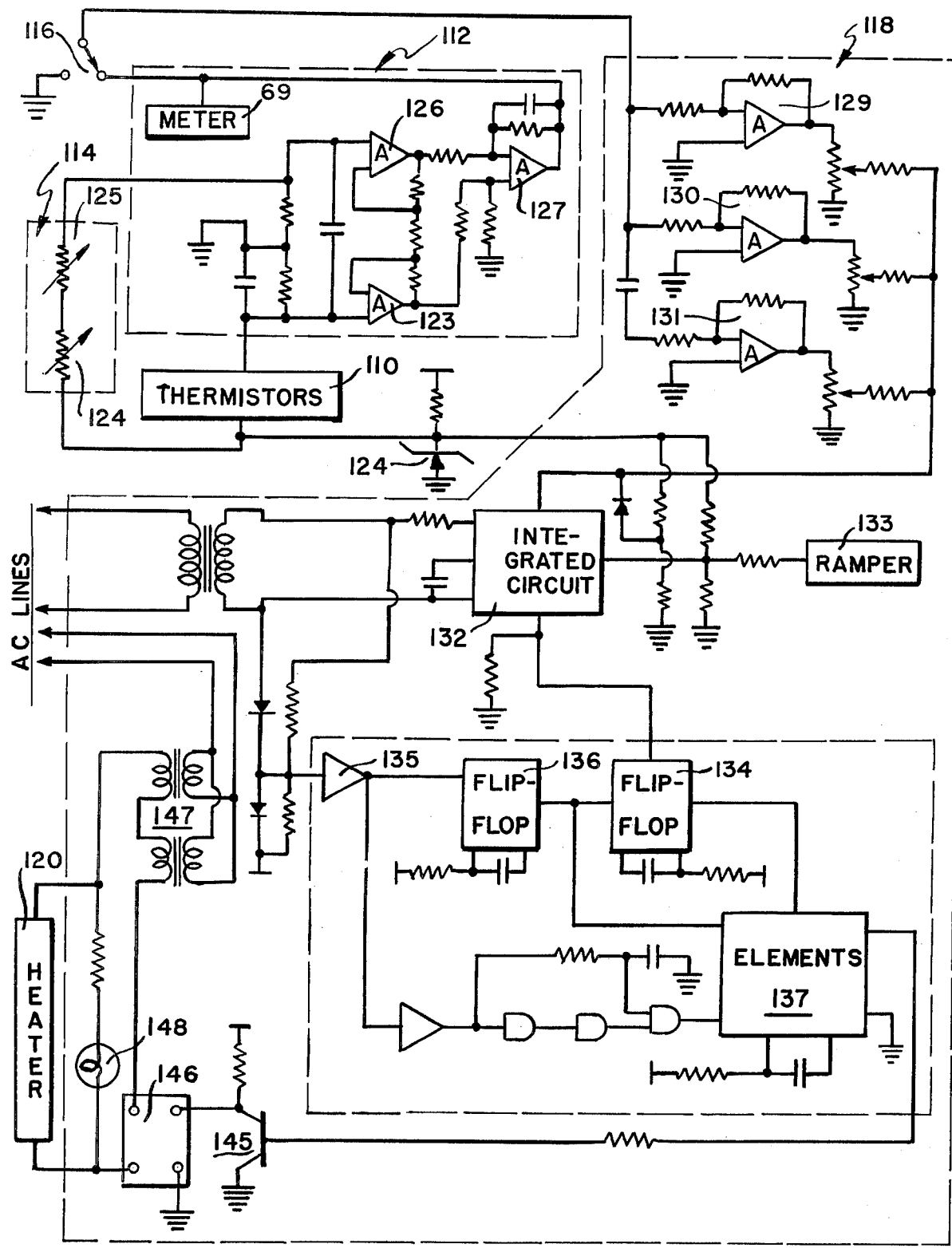
FIG. 4 is an electronic circuit diagram of the preheater temperature control.
Figure 5:
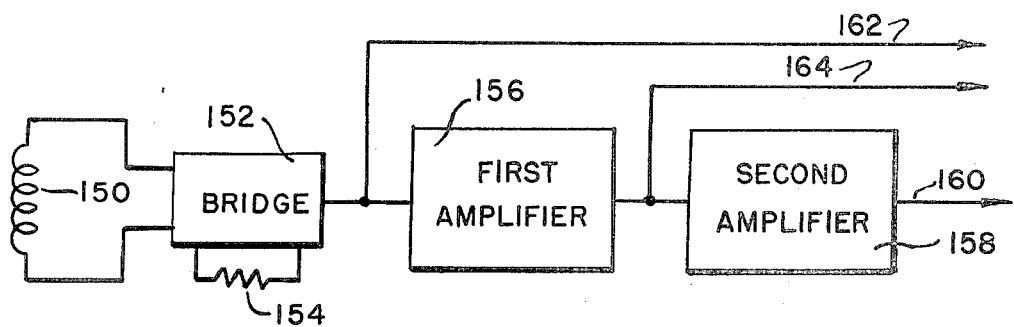

FIG. 4 is a circuit diagram of the preheater temperature control 68 of FIG. 3. In FIG. 4, elements are grouped in the form of a block diagram to illustrate their functions. Thus, thermistors 110, shown together in FIG. 4, are distributed physically along the length of preheater 62 of FIG. 3. Thermistors 110 are connected in series to provide to differential amplifier 112 an input that is proportional to temperature. The signal from thermistors 110 is compared to reference voltage 114 in differential amplifier 112. Microswitch 116 is located on an inlet door to the preheater to modify the operation of the preheater temperature control of FIG. 4 when the door is open. The preceding level of power then continues to be delivered to the preheater. When the door is closed, the signal from differential amplifier 112 is conducted to amplifier 118 to control the power to heater 120.

Examining FIG. 4 is more detail, thermistors 110 are connected between a Zener diode 122 and an operational amplifier 123. Reference voltage 114 is obtained by connecting variable resistors 124 and 125 in series between Zener diode 122 and operational amplifier 126, thence to ground through resistor 126a. Zener diode 122 controls the voltage applied to thermistors 110, variable resistors 124 and 125, and resistors 126a to provide a controlled input to operational amplifiers 123 and 126. These, in turn, are differentially connected to provide a differencce input to operational amplifier 127. The circuit just described operates to compare the resistance of the series combination of the two variable resistors 124 and 125 with the resistance of thermistors 110 and to produce an output that is proportional to the difference between the two values of resistance. That output, an error signal, is displayed on zero-center meter 69 and is coupled through microswitch 116 to amplifier 118. As described earlier, microswitch 116 modifies the operation of the circuit when a rod is being inserted into the preheater. Thus, the position shown of microswitch 116 in which the circuit is complete through microswitch 116 indicates the operating condition of the circuit of FIG. 4. Zero-center meter 69 is a monitor providing continuous display of the error signal produced from differential amplifier 112.

Amplifier 118 is a grouping of a number of functions that are combined to provide a control signal for heater 120 in response to the error signal received from differential amplifier 112. In amplifier 118, an error signal received through microswitch 116 is applied to the parallel combination of an amplifier 129, an integrator 130, and a band-limited differentiator 131, each with adjustable gain to allow an operator to optimize the response to amplifier 118 to an input error signal. The paralleled combination of the outputs of amplifier 129, integrator 130 and band-limited differentiator 131 is connected as an input to integrated circuit 132 which is a zero-voltage switch. Ramp generator 133 produces a sawtooth voltage at a fixed frequency of the order of 4 Hz to integrated circuit 132. Integrated circuit 132 forms a zero-voltage switch subject to the control of the sawtooth input from ramp generator 133 and the input signals from amplifiers 129 and 130 and band-limited differentiator 131. Integrated circuit 132 operates to pass a predetermined number of complete cycles of voltage at the power frequency and is operated in a conventional manner to assure that each of the complete cycles begins at a zero voltage so as to eliminate switching transients in the system. The output of integrated circuit 132 comprises a number of complete cycles of voltage at the power frequency. The number of cycles is determined by the value of the signal received by integrated circuit 132 from the parallel combination of amplifiers 129 and 130 and band-limited differentiator 131. The output of integrated circuit 132 is connected as an input to monostable flip-flop 134. A timing signal is derived by connecting from the a-c power line through buffer amplifier 135 to monostable flip-flop 136. The combination of monostable flip-flop 134, buffer amplifier 135, monostable flip-flop 136 and elements 137 forms a modified version of a well-known logic system producing a signal that is applied to transistor 145 to cause even cycling of Crydom controller 146. The term "Crydom" is a trademark describing a commercially available packaged electronic circuit that controls application of a-c power in reponse to a command signal. The even cycling assures operation of Crydom controller 146 in a mode that passes an even number of half-cycles of the a-c power frequency starting always in the same direction so as to prevent unilateral magnetization of the core of transformer 147.

The signal applied to transistor 145 provides a control signal for Crydon controller 146. Crydom controller 146 is connected in series with transformer windings 147 and heater 120 to provide on-off control of the voltage of transformer windings 147 to heater 120. Lamp 148 is connected across heater 120 to provide a visual indication when heater 120 is receiving power. Lamp 148 is a telephone cartridge lamp, GE48C2, chosen because it is designed to be turned on and off repeatedly. Lamp 148 provides a steady signal when heater 120 is operated at full current and a flashing signal when thermistors 110 are at or close to the control temperature.

FIG. 5 is a block diagram of the $T_3$ and $T_2$ temperature sense circuits. In FIG. 5, sense winding 150 is a length of nickel wire that is coupled thermally to first cylinder 74 of FIG. 3. The resistance of sense winding 150 is compared in bridge 152 with the value of a thermally stabilized reference precision resistor 154. Bridge 152 generates an output signal that is proportional to the difference in temperature between sense winding 150 and resistor 154. The signal from bridge 152 is amplified in first amplifier 156 and again in second amplifier 158 to develop an output 160 that exhibits maximum sensitivity. Output 162 of bridge 152 and output 164 of bridge 156 represent successively more sensitive levels of signals proportional to the temperature of sense winding 150 with output 160 being the most sensitive.

Figure 6:
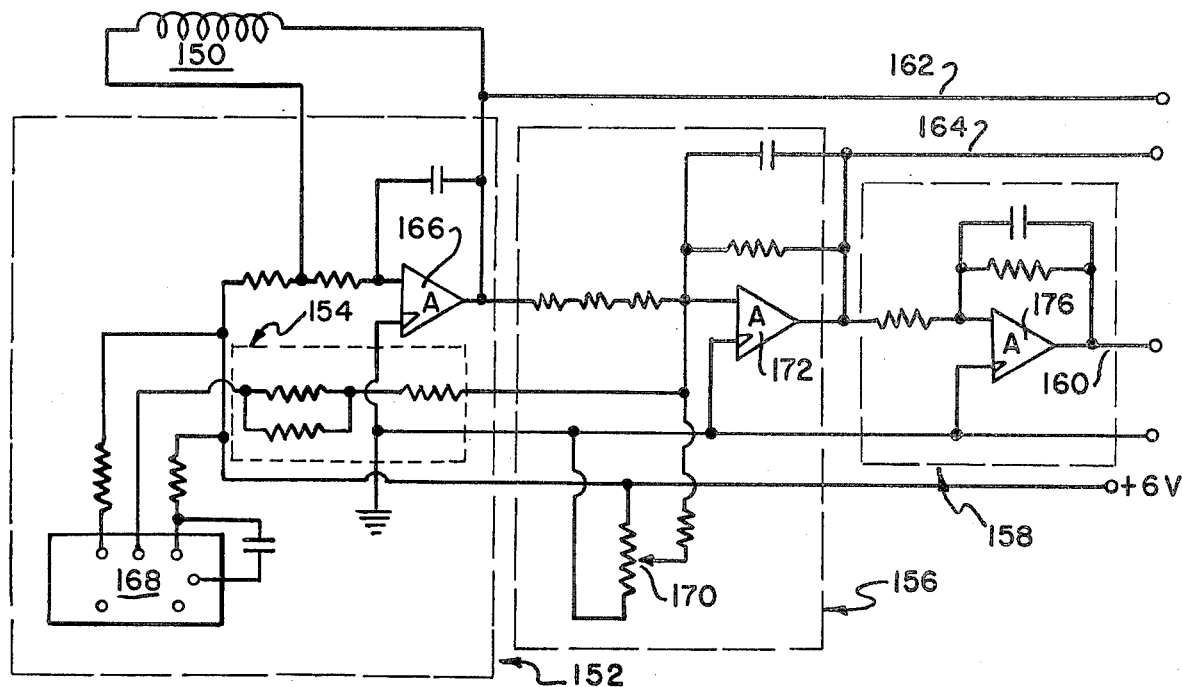
FIG. 6 is an electronic circuit diagram of the $T_2$ and $T_3$ temperature-sense circuits.

FIG. 6 is a schematic diagram of an electronic circuit that has been built to embody the functions illustrated in FIG. 5. In FIG. 6, elements are grouped to identify the numbers of FIG. 5. Thus, sense winding 150 is a length of wire that is connected to the input to chopper-stabilized amplifier 166. Resistor 154 comprises two paralleled 100-ohm precision resistors in series with a 1000-ohm resistor, all connected to voltage regulator 168 and stabilized thermally by placement within box 72 of FIG. 3. Resistor 154 forms part of a voltage divider that divides the output of a variable resistor 170 for input to chopper-stabilized amplifier 172. The control temperature of the circuit of FIG. 6 should be set five to fifteen K above ambient temperature and can be adjusted in two ways. A fixed adjustment, increasing the control temperature, can be achieved by shunting resistor 154 with various values of precisison resistance. An externally adjustable variation in temperature is achieved by changing the setting of variable resistor 170. Adjustment of either of the resistances mentioned enables the operator to select an operating temperature for testing that is above ambient temperature but not so far above that excessive heating, and thus excessive time, is required to make a measurement. A typical value is in a range of 10–12 K above ambient temperature. The output of amplifier 172 is brought out as output 164 and is also applied to amplifier 176 for further amplification. Output 160 from amplifier 176 is a voltage that is proportional to the temperature of sense winding 150 with a temperature sensitivity of the order of 5.4 volts/0.001 K.

Figure 7:
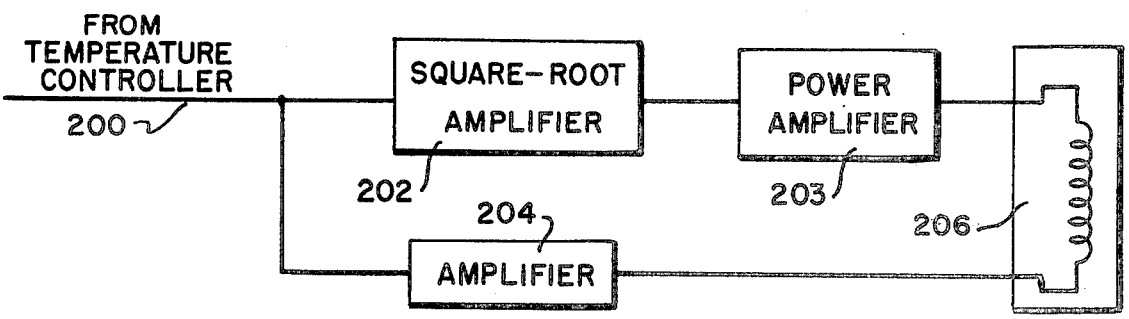
FIG. 7 is a block diagram of the $T_2$ and $T_3$ power amplifiers.

FIG. 7 is a functional block diagram of the circuit used to control power to the heaters maintaining temperatures $T_2$ and $T_3$. There are two identical circuits like FIG. 7, one controlling $T_2$ and the other controlling $T_3$. I FIG. 7, input 200 carries a signal from the appropriate temperature controller for $T_2$ or $T_3$ of FIG. 6. This signal is applied to square-root amplifier 202, thence to power amplifier 203, and also to parallel amplifier 204. Heater 206 is connected between the outputs of the two amplifiers 203 and 204 to respond to their combined control. Square-root amplifier 202 generates a signal proportional to the square-root of the input to account for the fact that the power supplied to heater 206 is proportional to the square of the voltage across it. Insertion of a square-root factor in square-root amplifier 202 thus linearizes the power as a function of the input error.

Figure 8:
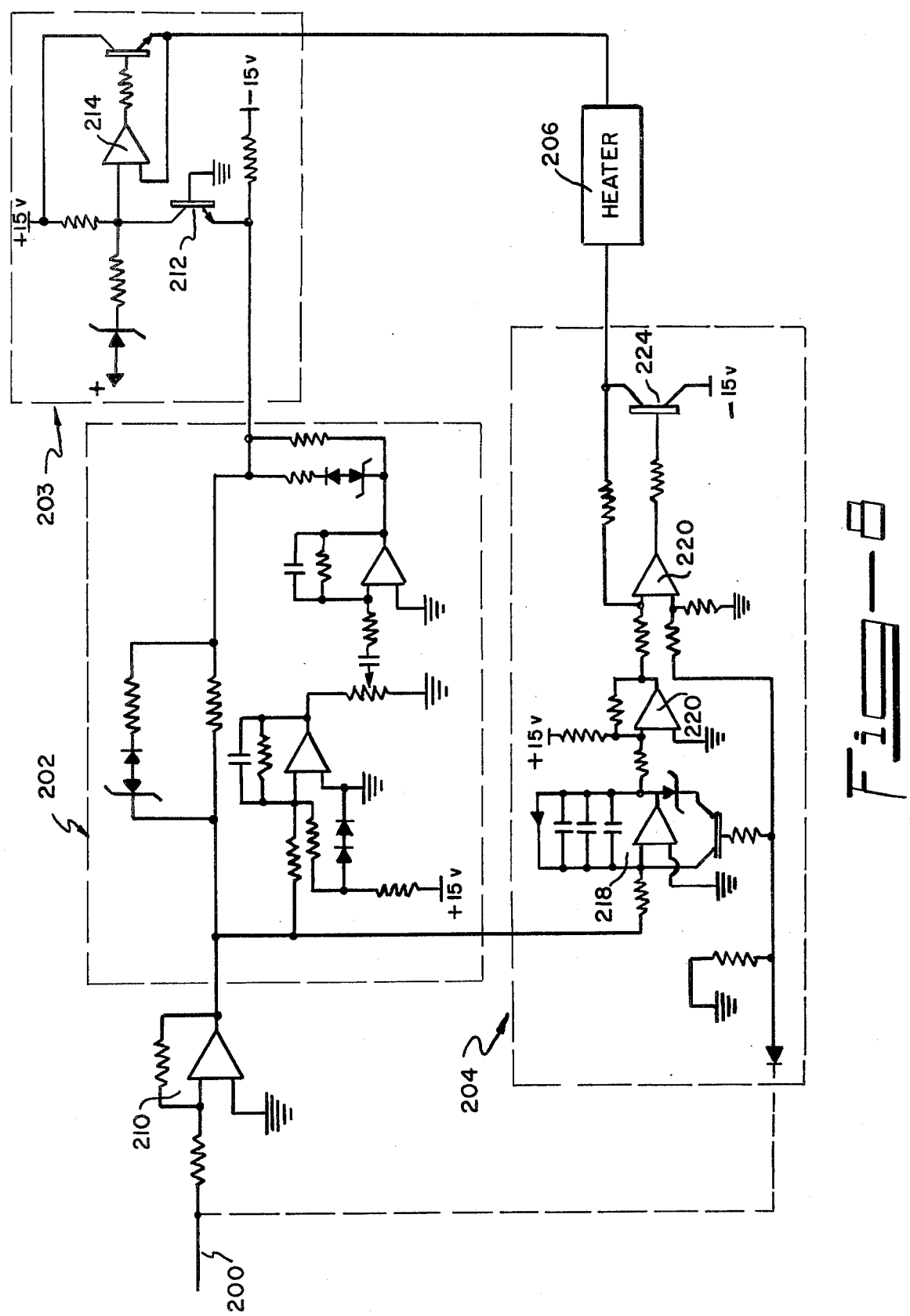
FIG. 8 is a circuit diagram of the $T_2$ and $T_3$ power amaplifiers and signal conditioners.

FIG. 8 is a circuit diagram of an amplifier that was built to perform the functions of FIG. 7. In FIG. 8, error terminal 200 receives an error signal that is applied to an isolation amplifier 210 and thence in parallel to square-root amplifier 202 and amplifier 204. Square-root amplifier 202 is a two-stage feedback amplifier with a combination of diodes and Zener diodes that produce the square-root characteristic. The squre-root characteristic is desirable because the power supplied to the heaters for controlling both temperatures $T_2$ and $T_3$ is essentially proportional to the square of the applied voltage or current. Hence, taking the square root of the error signal linearizes the applied power as a function of temperature. The output of the square-root amplifier is applied to the emitter of transistor 212 which is connected in a common-base configuration. The output of transistor 212 is amplified in operational amplifier 214 and is applied to the base of power transistor 216. The signal that was applied to square-root amplifier 202 is also applied to amplifier 204 comprising an integrator 218 coupled to a first amplifier 220, thence to a second amplifier 222. The output of second amplifier 222 is connected to the base of a power transistor 224. The two power transistors 216 and 224 are in series with the heater 206 to control the amount of power applied to heater 206.

Figure 9:
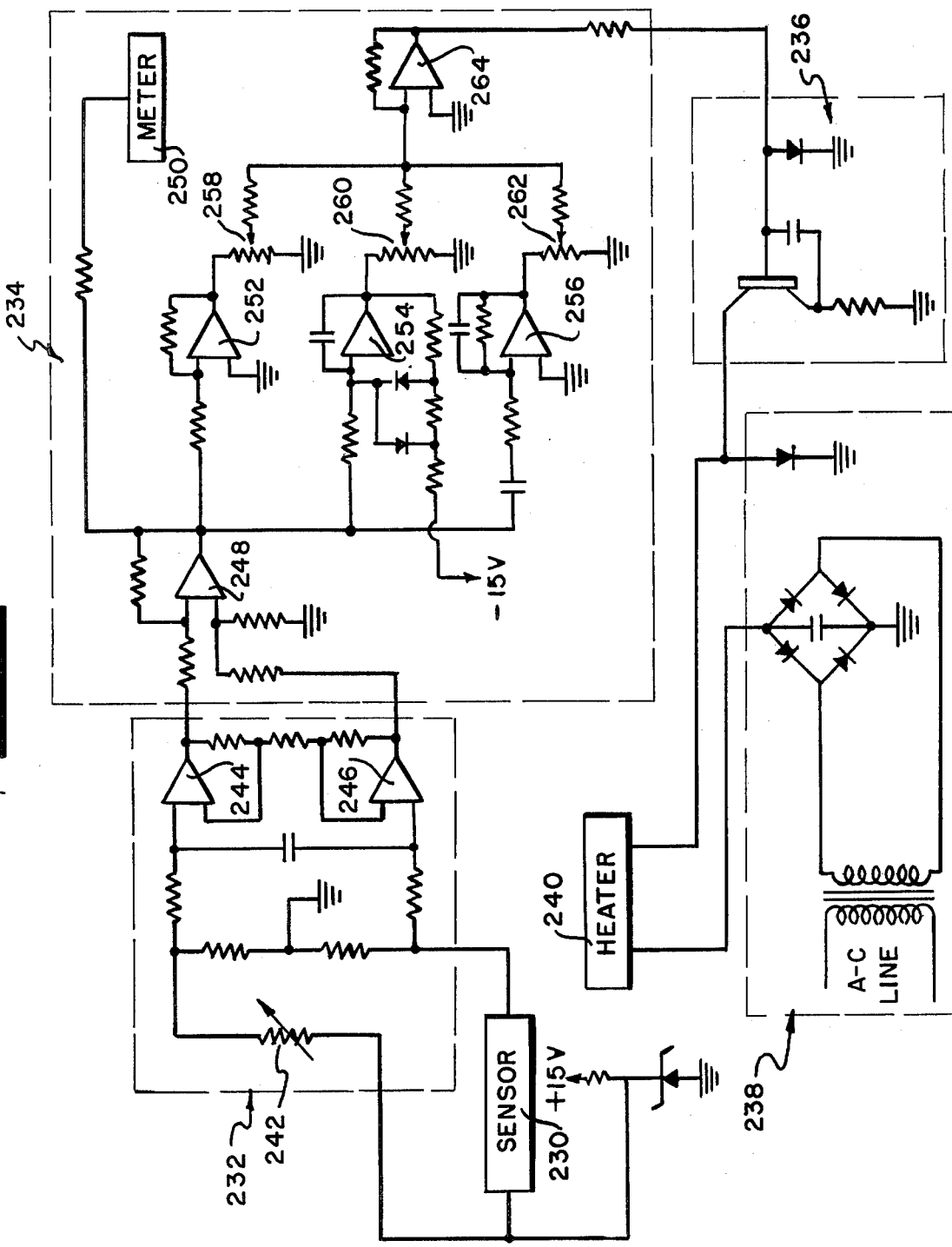
FIG. 9 is a circuit diagram of the $T_1$ control circuit and of the entrance and exit guard temperature controllers.

FIG. 9 is an electric circuit diagram of the $T_1$ temperature controller, the entrance guard controller, and the exit guard controller. Each of these functions has a separate circuit that is essentially identical to the circuits of the other two, so that there are three circuits like FIG. 9. In FIG. 9, sensor 230 generates an error signal that is detected in bridge 232 and amplified in amplifier 234 for application to power transistor circuit 236. This controls the application of electric power from power supply 238 to heater 240. Considering the elements in more detail, sensor 230 is a series string of thermistors connected in series with a variable resistor 242. Variable resistor 242 is adjusted to set operation for a desired ambient temperature. The series combination of sensor 230 and variable resistor 242 is connected in a symmetrical arrangement to two operational amplifiers 244 and 246 which form with assorted resistor and capacitors the elements of bridge 232. Balanced outputs from operational amplifiers 244 and 246 are applied to the inputs of operational amplifier 248 which produces a signal proportional to the difference in resistance between sensor 230 and variable resistor 242, and hence to error. The error signal is displayed on zero-center meter 250 and is applied in parallel to amplifier 252 and intergrators 254 and 256. Selected amounts of the output signals of amplifier 252 and integrators 254 and 256 are obtained from taps of variable resistors 258, 260 and 262, respectively. The selected signals are combined additively in amplifier 264, the output of which is applied to control power transistor 236. Power supply 238 is connected in series with heater 240 and power transistor circuit 236 so that power transistor circuit 236 controls the amount of power applied to heater 240 according to the control signals applied to power transistor circuit 236.

Figure 10:
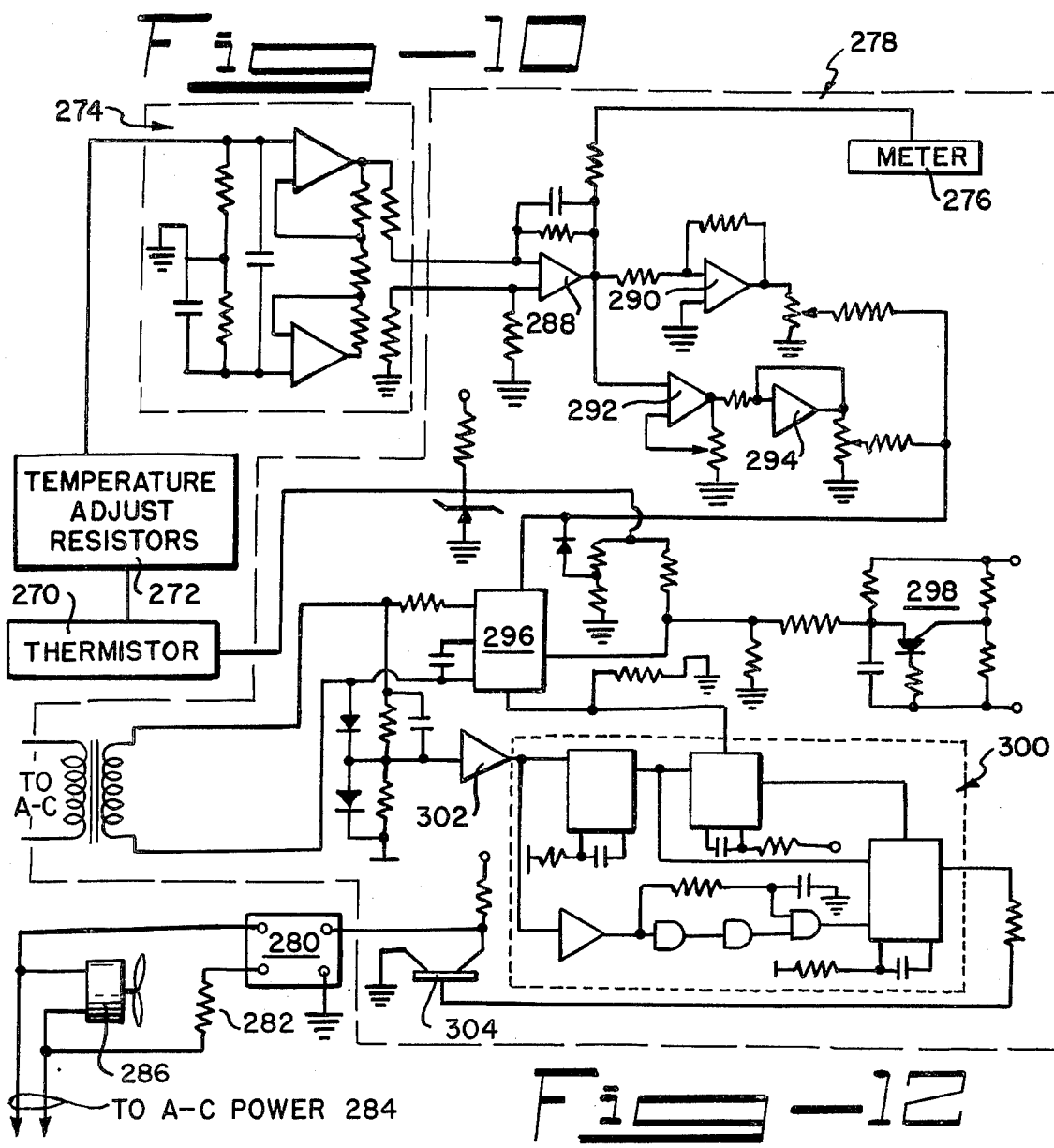
FIG. 10 is a circuit diagram of the box temperature controller.

FIG. 10 is an electronic circuit diagram of the box temperature controller, the set of electronic elements determining the last control temperature to be described. In FIG. 10, thermistor array 270 and temperature adjust resistors 272 generate inputs to bridge 274 which produces an error signal responsive to the difference between the two inputs. The error signal is displayed on zero-center meter 276 and is amplified and processed in electronic circuit 278 which generates an input signal to controller 280. Controller 280 is another Crydom controller. Controller 280 places a control element in series with heater 282 across the a-c power line 284. Fan 286 is also placed across a-c power line 284 to circulate air inside the box across heater 282 and thermistor array 270 to maintain an even temperature distribution throughout the box.

The operation of electronic circuit 278 of FIG. 10 will now be described in more detail. The output of bridge 274 is applied first to isolating amplifier 288 and then in parallel to an amplifier 290 and the cascaded combination of an isolating amplifier 292 and an integrator 294. Outputs of amplifier 290 and integrator 294 are combined for input to integrated circuit 296 which also receives as an input a ramp signal from ramp generator 298 and a 60-Hz signal from the power line. The output of integrated circuit 296 is applied to a logic circuit 300 together with a timing signal derived from the a-c power line and fed through amplifier 302. Logic circuit 300 generates a signal for application to transistor 304 and thence, after amplification, to Crydom controller 280. This signal will apply a selected number of individual pulses of a-c power from a-c power line 284 to heater 282 in response to the error signal.

The overall result of the structures and circuits described above is a sequence of temperature-controlled regions with the control of each contributing to an increased possibility of precision in the control of the temperature of the next one inside. There is a temperature sensor for each controlled temperature and a feedback controller for maintaining that temperature at a desired control value.

FIG. 11 is an electronic circuit diagram of the E × I multiplier that measures the power needed to maintain temperature $T_3$. In FIG. 11, $T_3$ heater 310 is tapped at its terminals to provide measurement of heater voltage and resistor 312 is connected in series with $T_3$ heater 310 to provide a voltage porportional to the current through $T_3$ heater 310. Voltage processor 314 generates an output from the voltage across heater 310 and current processor 316 generates a signal from the current through resistor 312. The outputs of voltage processor 314 and current processor 316 are combined multiplicatively in logical unit 318 which develops an output voltage proportional to the product of voltage and current. This output is applied to panel meter 320 as a visible measure of the power taken by $T_3$ heater 310 and is also applied as an input to voltage-to-frequency converter 322. The output of converter 322 is a pulsed signal at a constant value of voltage with a pulse frequency that is a function of the average power applied to $T_3$ heater 310.

Referring to the elements of FIG. 11 in more detail common point 324 between heater 310 and resistor 312 is connected through amplifier 326 to establish a reference point for measurement of voltage and current. The voltage across $T_3$ heater 310 is coupled to amplifier 328, thence to amplifier 330 which drives field-effect transistor (FET) 332. The output of FET 332 is a voltage that is a continuous analog to the voltage across $T_3$ heater 310, amplified and isolated therefrom. The voltage across resistor 312, which is proportional to the current through resistor 312 and hence to the current through $T_3$ heater 310, is amplified in amplifier 334 and is then coupled to integrator 336, which begins to ramp with a slope that is a function of the current through $T_3$ heater 310. The ramp is restarted when it reaches a fixed value so that the output of integrator 336 is a triangular wave having a frequency that is proportional to the current through $T_3$ heater 310. A constant-current source 338 is constructed using an amplifier 340 driving an FET 342. The current from FET 342 passes through AND gate 344 to ground when integrator 336 is ramping. During the reset portion of the ramp, the current from constant current source 338 passes through AND gate 346 to reset integrator 336. AND gate 348 thus receives two inputs, one a function of the voltage across $T_3$ heater 310 and one that is a function of the current through $T_3$ heater 310. These are combined in AND gate 348 to generate an output that is porportional to the power applied to $T_3$ heater 310. The output of AND gate 348 is applied to amplifier 350 which both serves as a buffer and also includes in a feedback loop a variable resistor 352 which provides an adjustment to calibrate panel meter 320. The output of amplifier 350 is converted in voltage-to-frequency converter 322 to a train of pulses of constant amplitude at a frequency that is proportional to the power taken by $T_3$ heater 310.

Figure 12:
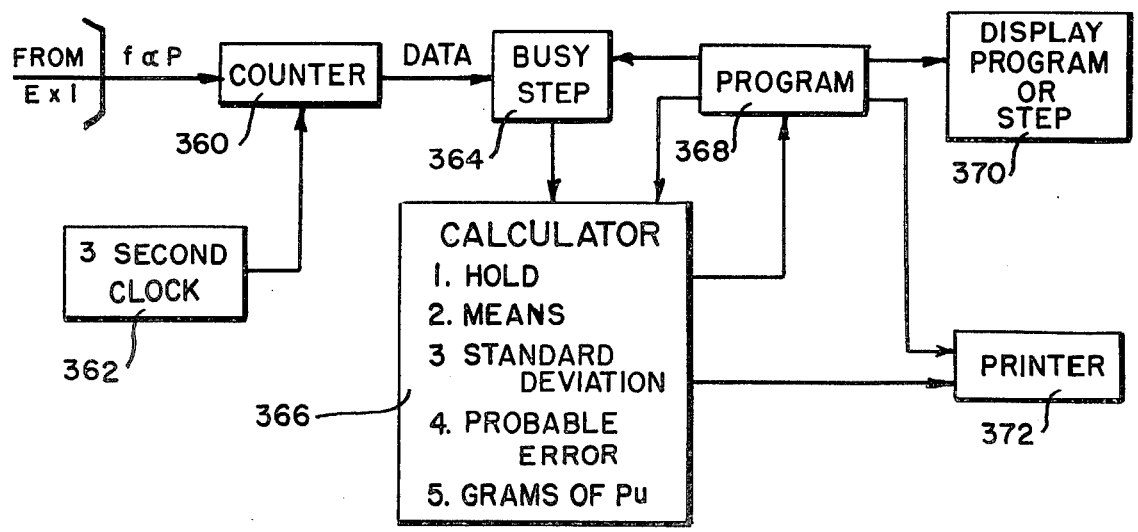
FIG. 12 is a circuit diagram of the controller.

The output of the circuit of FIG. 11 is processed as shown in FIG. 12 which is a functional block diagram showing the operation of the error detector 104 and readout controller 106 of FIG. 3. In FIG. 12, a signal from the E × I controller of FIG. 11 is coupled to counter 360. This signal is a train of pulses having a frequency proportional to the power delivered to the $T_3$ heater 310 of FIG. 11. Counter 360 is reset at intervals of 3 seconds by clock 362 so that the output of counter 360 is a signal representing a number that is the number of pulses received by counter 360 during the preceding 3-second interval. This signal in general changes as a result of updated information every 3 seconds and is a measure of the electric power supplied to $T_3$ heater 310 of FIG. 11 during that interval. The signal from counter 360 is applied to busy tests 364 which holds the signal until it is ready to be applied to calculator 366. Calculator 366 comprises a combination of a commerically available portable electronic calculator having statistical capability and a number of electronic logical elements. The particular calculator used in an embodiment of the invention that was constructed was a Hewlett-Packard HP-45, an electronic calculator with callable memory registers and built-in programs for calculating means and standard deviations of input data. Calculator 366 is subject to the control of program 368, a commercially available integrated circuit that is programmed to control calculator 366. Although the number of functions and modes of operations that could be performed is almost limitless with a calculator such as the HP-45 and an external program control, those that were performed in the embodiment that was built were the following:

a. Receive and hold data comprising values of power from counter 360 through busy tests 364 for a selected number of readings, typically 50.

b. Calculate the mean value of the power readings received.

c. Receive and store a permissible value of standard deviation of the mean of the power readings.

d. Calculate the standard deviation of the power readings actually received.

e. Compare the allowed standard deviation with the calculated standard deviation.

f. Calculate the probable error of the mean.

g. Calculate the probable error of the standard deviation.

h. Compare the standard deviation that is calculated after 50 repetitions with the allowed standard deviation and repeat another cycle of 50 if the allowed standard deviation is less than the calculated standard deviation.

i. Calculate grams of plutonium in fuel rod from a given algorithm.

j. Display the current program step on program step display 370.

k. Print selected information on printer 372.

The information that is printed is subjected to the control of program 368 but will most typically include the calculated grams of plutonium, the calculated means values and standard deviations of the power readings, and the number of measurments made to achieve these results.

The use of a commercial calculator such as the HP-45 with its built-in calculations of statistical quantities and its built-in memory registers both simplified the problems of constructing electronic control of the fuel rod calorimeter and also provided great flexibility when combined with the use of a commercial programmable memory for program 368. The items calculated and the number of sequential steps used were convenient in facilitating the operation of a particular fuel rod calorimeter that was constructed using the principles of the present invention. The use of the standard deviation of observed measurements as a measure of the necessary time to achieve a desired accuracy was particularly useful in the operation of the calorimeter. However, this measurement and the other measurements described are not necessary for the operation of the invention. What is necessary is an accurate measurement of the change in power required to maintain the temperature of the $T_3$ controller with and without a fuel rod in place. That change inpower is the amount of power supplied by the active portion of the fuel rod. A routine calculation based upon known principles permits calculation from this information of the amount of heat-producing fuel material such as plutonium that is in the rod that has been measured.

A prototype of an apparatus for the practice of the present invention has been built at the Argonne National Laboratory. This phototype was designed to analyze fuel rods for the Fast Flux Test Facility (FFTF). These rods are approximately 3 meters long, 6 mm in diameter and contain fuel pellets in a section which has been called the active portion and is about 1 meter in length. The preheater was sized to contain an entire fuel rod while the measuring chamber was only slightly longer than the active portion of the rod. Thus, portions of the rod projected from the measuring chamber at both ends, but since the active portion of the FFTF fuel rods was near one end of the rod most of the projection was beyond the exit guard and onto the exit table.

Using the instrument described above with a measuring temperature approximately 11 K above ambient, measurements were made on a number of FFTF fuel rods and compared with results obtained by destructive chemical analysis of fuel pellets from the same rods. Comparisons were also made with results obtained by calorimetric measurement of the heat produced by fuel elements in liquid calorimeters at the Mound Laboratories. The measurements achieved by the instrument embodying the present invention were found to compare to the chemical and liquid calorimetric measurements with a single-measurement precision of 0.12% to 0.13%. The average time required per measurement was approximately 15 minutes after preheating and the typical preheat time was less than 15 minutes, so that preheat time was not the limiting factor in determining the test rate. The prototype instrument is readily separable into a measuring chamber, a preheater, and electronic chassis, and a readout controller unit. Each of the control units when separated weighed less than 20 kg and the package of all the components is readily transportable. Assembly at a test site is simply a matter of aligning and connecting the preheater and the measuring chamber box, connecting cables to each from the electronic chassis and readout controller, and making a connection to an a-c power source. When this is done, it is possible to measure the activity of fuel rods simply, rapidly and accurately.

Earlier prototypes in the development that led to the present invention applied calorimetric measurement techniques to individual fuel pellets. If the need existed, it would be a routine matter to construct an apparatus according to the principles of the present invention that was sized to measure the heat produced by an individual fuel pellet with an accuracy and a measuring time comparable to that achieved for fuel rods. The same is true for the testing of heat-producing nuclear fuel in any of the other forms described earlier, such as plates, assemblies and the like. It would only be necessary to shape the preheater to hold the fuel element to be measured and make the measuring chamber in the box in an appropriate size and shape to hold that element.

The embodiments of the invention in which an exclusive property or privilege is claimed are defined as follows:

1. A method of measuring the amount of heat-producing radioactive material in a quantity of nuclear fuel having a known isotopic ratio comprising the steps of: measuring the electric power required to maintain a test chamber at a given temperature with no nuclear fuel in the chamber; inserting the quantity of nuclear fuel into the chamber; repeatedly measuring the electric power required to maintain the test chamber at the given temperature with the quantity of nuclear fuel inserted; subtracting to obtain the difference of the measured powers; calculating the mean values of readings of the electric power thus required; calculating the standard deviation of the mean value of the electric power thus required; terminating the measuring sequence when the standard deviation of the mean value of the electric power thus required is less than a predetermined value of standard deviation; and calculating to convert the difference of the measured powers into a measure of the amount of heat-producing radioactive material.

2. An apparatus for measuring the heat generated by a quantity of nuclear fuel comprising: means for preheating the fuel to a predetermined temperature; an inner chamber adapted to receive the preheated nuclear fuel; means for measuring the temperature of the inner chamber; means responsive to the measured temperature of the inner chamber for controlling the temperature of the inner chamber to a predetermined value; an intermediate chamber substantially enclosing the inner chamber; means for measuring the temperature of the intermediate chamber; means responsive to the measured temperature of the intermediate chamber for controlling the temperature of the intermediate chamber to a value close to but less than the temperature of the inner chamber; an outer chamber substantially enclosing the intermediate chamber and the inner chamber; means for controlling the temperature of the outer chamber substantially at the temperature of the intermediate chamber; an entrance guard chamber disposed at an entrance to the inner chamber and coupled thermally thereto to control and minimize heat flow between the inner chamber and the entrance guard; means coupled to the entrance guard for controlling the temperature of the entrance guard substantially at the temperature of the inner chamber; an exit guard thermally coupled to the inner chamber at an exit therefrom; means coupled to the exit guard for controlling the temperature thereof substantially at the temperature of the inner chamber; and means for measuring the electric power delivered to the means for controlling the temperature of the inner chamber, which electric power is a measure of the power produced by the nuclear fuel.

3. The apparatus of claim 2 wherein the means for controlling the temperature of the inner chamber to a predetermined value comprise means for controlling said temperature to a predetermined value with a precision of 20 microK.

4. A portable dry calorimeter for making fast measurements of the quantity of heat-producing nuclear fuel in a nuclear fuel rod containing nuclear fuel of known isotopic fractions, the calorimeter comprising: a cylindrical preheater chamber sized to accept the nuclear fuel rod; heating means coupled thermally to the preheater chamber to maintain the temperature of the preheater chamber at a predetermined value; switch means connected to the preheater controller and responsive to the insertion of a nuclear fuel rod into the preheater chamber to maintain a constant value of electric power delivered to the preheater chamber during insertion of a nuclear fuel rod into the chamber; a cylindrical test chamber coaxial with the cylindrical preheater chamber, having a diameter slightly greater than the diameter of a fuel rod to be measured and having a length slightly greater than the length of the portion of the fuel rod containing nuclear fuel material; means connected to the test chamber for measuring the temperature of the contents of the test chamber; a first power amplifier connected to the means for measuring temperature of the test chamber and to the test chamber for delivering a controlled amount of electric heating power to the test chamber; a first buffer cylinder coaxial with and substantially enclosing the test chamber; means connected to the first buffer cylinder for measuring the temperature of the first buffer cylinder; means connected to the first buffer cylinder and responsive to the temperature of the first buffer cylinder for maintaining the temperature of the first buffer cylinder a precisely predetermined amount below the temperature of the test chamber; a second buffer cylinder coaxial with and substantially enclosing the first buffer cylinder; means connected to the second buffer cylinder for sensing and controlling the temperature of the second buffer cylinder substantially at the temperature of the first buffer cylinder; an entrance guard cylinder coaxial with the test chamber and disposed in line with the test chamber at a first end thereof to control and minimize the axial flow of heat from the test chamber at the first end of the test chamber; means connected to the entrance guard for sensing and controlling the temperature of the entrance guard at a value substantially equal to the temperature of the test chamber; an exit guard cylinder coaxial with the test chamber and disposed in close proximity to the test chamber at an end opposite to the first end of the test chamber to control and minimize the flow of heat in an axial direction from and to the test chamber; means connected to the exit guard chamber for sensing and controlling the temperature of the exit guard chamber; a box enclosing the test chamber, the first buffer cylinder, the second buffer cylinder, the entrance guard and the exit guard except at an inlet location and an exit location along the axis of the test chamber, the first and second buffer cylinders and the entrance and exit guards to permit the passage therethrough of a nuclear fuel rod; means connected to the test chamber for measuring the electric power required to control the temperature of the test chamber at the predetermined value; an electronic control circuit connected to the means for measuring power delivered to the test chamber, the electronic control circuit including the functions of storing values of the power reading, calculating the mean values of successive power readings, calculating the standard deviation of the mean values of power readings, repeating calculations for a predetermined number of values or until the standard deviation is within a predetermined value, and printing stored information.

5. The apparatus of claim 4 wherein the electronic control circuit includes an electronic calculator and a programmable memory connected to the electronic calculator.

\* \* \* \* \*